F. R. LOCKHART AND H. G. ORD.
MOTION PICTURE PROJECTOR.
APPLICATION FILED JULY 2, 1917.
1,330,040.
Patented Feb. 3, 1920.
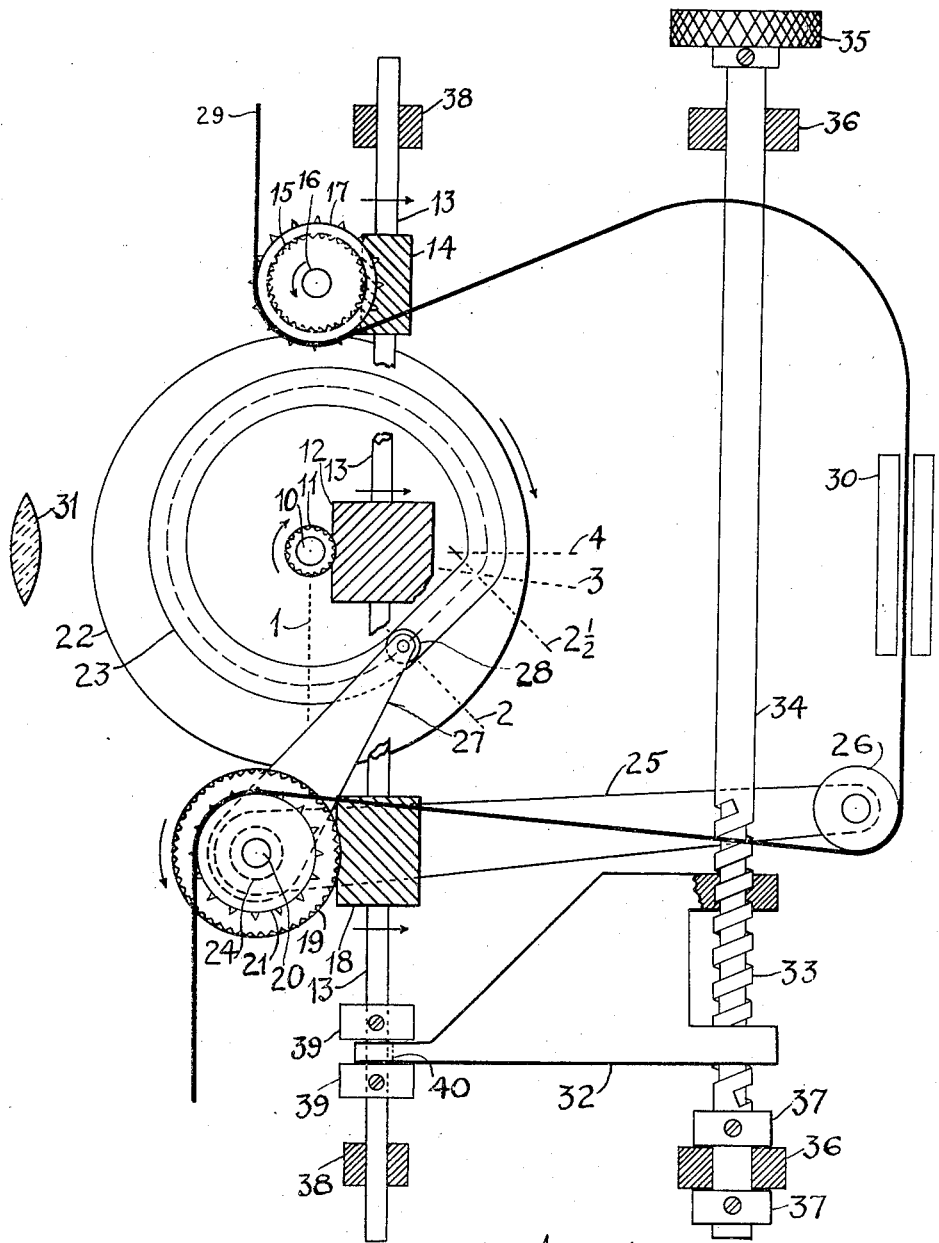
Inventors,
Frederick R. Lockhart
Harry G. Ord
by Wm. J. Heedman Atty.

UNITED STATES PATENT OFFICE.

FREDERICK R. LOCKHART AND HARRY G. ORD, OF TORONTO, ONTARIO, CANADA, ASSIGNORS TO FRANK M. BEESLEY, OF TORONTO, CANADA.

MOTION-PICTURE PROJECTOR.

1,330,040.    Specification of Letters Patent.    Patented Feb. 3, 1920.

Application filed July 2, 1917. Serial No. 178,119.

*To all whom it may concern:*

Be it known that we, FREDERICK R. LOCKHART, a citizen of the Dominion of Canada, and a resident of Toronto, county of York, and Province of Ontario, Canada, and HARRY G. ORD, a citizen of the Dominion of Canada, and resident of Toronto, county of York, and Province of Ontario, Canada, have jointly invented a new and useful Improvement in Motion-Picture Projectors, of which the following is a specification.

Our invention pertains to motion picture projectors and the object of our invention is to produce an improved film shift and framing device having a uniform upper film loop.

We accomplish these improvements by shifting the film by a film shifter driven by a cam follower in a specially designed groove, by driving the lower film sprocket through a manually shiftable gear shaft between driving and driven gears, and by gearing upper and lower film sprockets together in such manner that they always move at similar speeds.

Referring to the drawing, main shaft 10 turning in the direction indicated by the arrow carries main spiral gear 11 meshing spiral gear 12 (a ratio of 1 to 2 is indicated) and driving framing shaft 13 in the direction indicated by the arrows upon each of of its three parts. Framing shaft 13 is broken away to reveal the cam groove and cam follower described later herein.

Framing shaft 13 carries reversed spiral gear 14 which meshes gear 15 (a ratio of 1 to 2 is indicated) and drives upper shaft 16 and upper sprocket 17 in the direction indicated by the arrow. Framing shaft 13 carries also reversed spiral gear 18 which meshes gear 19 (a ratio of 1 to 2 is indicated) and drives lower shaft 20 and lower sprocket 21 in the direction indicated by the arrow.

Main shaft 10 carries also cam wheel 22 provided with cam groove 23 therein.

Lower shaft 20 has sleeved upon it the tubular sleeve 24, upon which part 24 are rigidly fixed the radial shifter arm 25 and the radial cam arm 27. Shifter arm 25 carries the cylindrical shifter 26 and cam arm 27 carries the cylindrical cam follower 28 working in cam groove 23 of cam wheel 22. The center line of the cam groove 23 is indicated by a broken line. The variations in radii of the broken line of cam groove 23 as measured from the axis of the main shaft 10 will determine the movement imparted to the cam arm 27, since the axis of the cam follower 28 always follows the broken line shown.

The movement of the shifter 26 is determined by the movement of the cam follower 28.

The film 29 is fed by upper sprocket 17 to film gate 30, an upper loop being formed between the parts 17 and 30. The film 29 then passes under shifter arm 26 and is fed out of the shifting mechanism by the lower sprocket 21, a lower loop being formed around the shifter 26.

A projecting lens 31 is indicated opposite the film gate 30.

The detail of the cam groove in the cam wheel 22 is as follows: From radius 1 to radius 2, a circular arc concentric with the cam wheel. From radius 2 to radius 3, a straight line tangent to the preceding arc. From radius 3 to radius 4, a circular arc upon a short radius as indicated by line 2½. From radius 4 to radius 1, a spiral arc of diminishing radius and tangent at both ends to the circular arcs described above.

The extent of each of the parts of the cam groove described, measured in degrees of angles about the center of the cam wheel, is as follows: From radius 1 to radius 2, 45 degrees; from radius 2 to radius 3, 35 degrees; from radius 3 to radius 4, 10 degrees; from radius 4 to radius 1, 270 degrees.

The movement of the cam follower 28 effected by the cam groove 23 is as follows: From radius 1 to radius 2, no movement; from radius 2 to radius 3, a rapid movement outward; from radius 3 to radius 4, the outward movement is checked; from radius 4 to radius 1, a gradual movement inward.

The movement of the shifter 26 effects the intermittent movement of the film in accordance with this control.

The movement of the film 29 through the film gate 30 effected by the film shifter 26 is as follows: While cam wheel 22 turns from radius 1 to radius 2 under the cam follower, shifter 26 is motionless and lower sprocket 21 draws the film 29 tight against the shifter 26. As cam wheel 22 passes radius 2 under the cam follower the film begins to move through the film gate 30, started by the pull of sprocket wheel 21 and immediately shifter 26 moves downward and gives the film nearly a full step while cam wheel 22 turns from radius 2 to radius 3 under the cam follower. There is no blow delivered by the shifter upon the film as occurs in a beater mechanism. While the cam wheel turns from radius 3 to radius 4 under the cam follower, shifter 26 is checked and sprocket wheel 21 completes the step of the film 29 by drawing it tightly against the shifter 26 which is momentarily comparatively motionless and the film image is brought to its proper position in the film gate 30. As cam wheel 22 passes radius 4 under the cam follower, shifter 26 begins to rise and slacks the tension upon the film 29 so that it rests motionless in the film gate 30. The shifter 26 rises at a steady rate and the lower sprocket 21 draws the film 29 at a steady rate, so that the film 29 is kept at all times in contact with the shifter 26. To effect this feature, the period of ascent of the shifter is much longer than the period of descent due to the shape of the cam groove 23.

The framing of the film 29 in the film gate 30 is effected by traveler 32 upon screw thread 33 in the framing rod 34 turned manually by knurled head 35. Framing rod 34 turns in journals 36, 36, but cannot shift endwise because of set collars 37, 37. Framing shaft 13 turns in journals 38, 38 and shifts endwise as controlled by the traveler 32. Traveler 32 has a fork (indicated in part by the dotted line 40) which spans the framing shaft 13 between the set collars thereon 39, 39.

The reversals of the angular directions of the spiral gears 14, 12 and 18 upon the framing shaft 13 effects the following framing action: If knurled head 35 be turned to lift traveler 32, the main shaft 10 being at the time motionless, gear wheel 12 will be turned as it slides past gear 11, shaft 13 will be turned by gear 12, and both the lifting of the shaft and the turning of the shaft 13 will cause gear 18 to turn gear 19 which will turn sprocket wheel 21 to draw the film 29 down through the film gate 30 into "frame", the shifter 26 being at this time motionless because main shaft 10 and cam wheel 22 are motionless. The turning of lower sprocket 21 in framing will be effective upon the film when the projector is running, the framing increment of motion of the lower sprocket 21 being added to the normal driving movement of the sprocket 21 when the traveler 32 is lifted and being subtracted from the normal driving movement when the traveler 32 is depressed. By sliding framing shaft 13 along its axis, the relative angular positions of gear 11 and gear 19 will be changed but the relative angular positions of gear 19 and gear 15 will not be changed.

The upper film loop is constant because the framing control upon the lower sprocket 21 is effective upon the upper sprocket 17 also, the sprockets 17 and 21 being geared together through the framing shaft 13 in such manner that one always feeds film into the loop at the same rate as the other takes film from the loop.

A supporting frame or box, not shown in the drawings, supports parts 10, 13, 16, 20, 30, 31, 36, 36, 38, 38.

While we have illustrated and described but one embodiment of our device it is to be clearly understood that we may vary the details thereof without departing from the spirit or narrowing the scope of our invention.

Having thus described our invention fully what we claim as new and desire to secure by United States Letters Patent is as follows:

1. In a motion picture projector, a framing device comprising a framing shaft having spiral gears of different directions, and having corresponding spiral gears in mesh therewith.

2. In a motion picture projector a framing device comprising, a driving shaft, a first driven shaft, a second driven shaft, and intermediate mechanical elements connecting said three shafts whereby the angular relation of the said driven shafts may be maintained while the angular relation of said driving and said driven shafts may be changed.

3. In a motion picture projector a framing device comprising, a framing shaft, a pair of opposed spiral gears upon said shaft, driving and driven shafts having gears meshing said opposed spiral gears respectively whereby rotation of the driving shaft will rotate said framing shaft and thus rotate said driven shaft, means for moving said framing shaft laterally along its axis whereby by the opposition of the spiral gears said driven shaft is given a movement independent of the movement of said driving shaft.

4. In a motion picture projector, a framing device comprising, a main shaft, a lower film shaft, an upper film shaft, and a single mechanical moving element uniting said three shafts in a system of power transmission by spiral gears carried by said shafts, said film shafts having direct-spiral gears to maintain invariable angular relation and said main shaft having a reversed spiral gear to produce variable angular relation to the said film shafts under control of said movable element.

5. In a motion picture projector, a framing device comprising, a main shaft, a lower film shaft, an upper film shaft, a single mechanical moving element uniting said three shafts in a system of power transmission, said film shafts having invariable angular relation and said main shaft having variable angular relation to the said film shafts, and means for varying the relation of the main and film shafts at will.

Signed by us at Toronto, county of York, and Province of Ontario, in the presence of two witnesses.

FREDERICK R. LOCKHART.
HARRY G. ORD.

Witnesses:
W. E. DENT,
DAVID S. HULFISH.